(12) United States Patent
Tan et al.

(10) Patent No.: US 12,154,725 B2
(45) Date of Patent: Nov. 26, 2024

(54) CAPACITOR STRUCTURE AND POWER CONVERTER

(71) Applicant: Sungrow Power Supply Co., Ltd., Hefei (CN)

(72) Inventors: Jun Tan, Anhui (CN); Qiyao Zhu, Hefei (CN); Hao Zheng, Hefei (CN); Xianwei Zhang, Hefei (CN)

(73) Assignee: Sungrow Power Supply Co., Ltd., Hefei (CN)

( * ) Notice: Subject to any disclaimer, the term of this patent is extended or adjusted under 35 U.S.C. 154(b) by 0 days.

(21) Appl. No.: 17/665,414

(22) Filed: Feb. 4, 2022

(65) Prior Publication Data
US 2022/0375687 A1    Nov. 24, 2022

(30) Foreign Application Priority Data
May 21, 2021 (CN) .......................... 202121110112.4

(51) Int. Cl.
| | |
|---|---|
| *H01G 4/38* | (2006.01) |
| *H01G 4/224* | (2006.01) |
| *H01G 4/232* | (2006.01) |
| *H01G 4/32* | (2006.01) |
| H01G 4/005 | (2006.01) |

(Continued)

(52) U.S. Cl.
CPC ............... *H01G 4/38* (2013.01); *H01G 4/224* (2013.01); *H01G 4/232* (2013.01); *H01G 4/32* (2013.01);
(Continued)

(58) Field of Classification Search
CPC ............ H01G 2/08; H01G 4/224; H01G 4/28; H01G 4/32
See application file for complete search history.

(56) References Cited

U.S. PATENT DOCUMENTS

| | | | | |
|---|---|---|---|---|
| 3,185,907 A | * | 5/1965 | McKee | .................. H01G 4/008 29/25.42 |
| 4,264,943 A | * | 4/1981 | Anderson | ................ H01G 4/32 29/25.03 |

(Continued)

FOREIGN PATENT DOCUMENTS

WO    WO 2017/150151 A1    9/2017

OTHER PUBLICATIONS

Partial European Search Report for European Application No. 22155528.7, dated Jul. 20, 2022.

*Primary Examiner* — Eric W Thomas
(74) *Attorney, Agent, or Firm* — Wolf, Greenfield & Sacks, P.C.

(57) ABSTRACT

A capacitor structure and a power convertor are provided by the present disclosure. The capacitor structure includes a housing and at least one core arranged inside the housing, and two electrodes of the capacitor structure are respectively led out from two ends of the housing. Thus, the pole piece required in a case that electrodes are led from the same end of the housing is omitted, thereby saving material cost. Besides, the housing and the core are respectively hollow structures, and the internal heat of the capacitor structure can be ventilated and dissipated through the corresponding hollow part, thereby improving the heat dissipation performance of the capacitor structure. In addition, by arranging the fin heat dissipation teeth on the housing, the heat dissipation area can be increased to further improve the heat dissipation efficiency.

7 Claims, 5 Drawing Sheets

(51) Int. Cl.
  *H01G 4/33* (2006.01)
  *H02M 3/155* (2006.01)
  *H02M 5/293* (2006.01)
  *H02M 7/537* (2006.01)

(52) U.S. Cl.
  CPC .............. *H01G 4/005* (2013.01); *H01G 4/33* (2013.01); *H02M 3/155* (2013.01); *H02M 5/293* (2013.01); *H02M 7/537* (2013.01)

(56) References Cited

U.S. PATENT DOCUMENTS

| | | | |
|---|---|---|---|
| 5,940,264 A * | 8/1999 | Stevens | H01G 2/08 361/709 |
| 6,762,926 B1 | 7/2004 | Shiue et al. | |
| 9,378,889 B2 | 6/2016 | Nunez-Barranco Patino | |
| 9,865,398 B2 | 1/2018 | Jakoubovitch et al. | |
| 2006/0133008 A1* | 6/2006 | Scheidegger | H01G 4/38 361/301.5 |
| 2007/0242413 A1* | 10/2007 | Drugge | H01G 4/385 361/301.3 |
| 2008/0002311 A1* | 1/2008 | Bond | H01G 4/32 361/15 |
| 2013/0194712 A1* | 8/2013 | Lavene | H01G 4/28 361/274.1 |
| 2014/0301018 A1* | 10/2014 | Ichinose | H01G 2/08 361/301.5 |
| 2016/0005544 A1* | 1/2016 | Jakoubovitch | H01G 4/224 29/25.42 |
| 2017/0062131 A1* | 3/2017 | Yeh | H01G 4/228 |
| 2018/0330883 A1 | 11/2018 | Sano | |

* cited by examiner

CAPACITOR STRUCTURE AND POWER CONVERTER

CROSS REFERENCE TO RELATED DISCLOSURES

The present application claims priority to Chinese Patent Application No. 202121110112.4, titled "CAPACITOR STRUCTURE AND POWER CONVERTER", filed on May 21, 2021 with the China National Intellectual Property Administration, which is incorporated herein by reference in its entirety.

FIELD

The present disclosure relates to the technical field of power electronics, and in particular, to a capacitor structure and a power converter.

BACKGROUND

A core of a film capacitor in conventional technology mostly adopts a winding process, and electrodes are respectively led out at both ends of the core, and then the entire core and the corresponding electrodes are placed in a corresponding housing.

Figure 1:
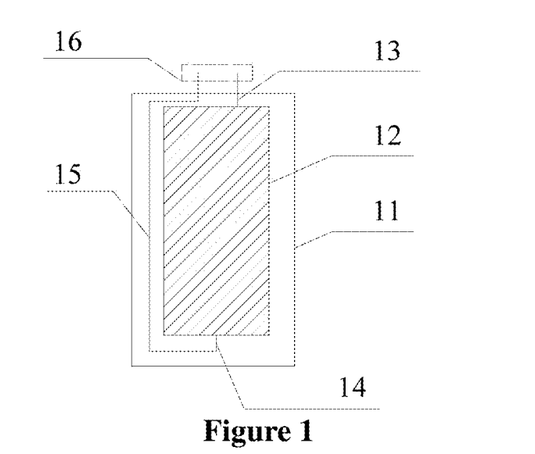
FIG. 1 is a longitudinal cross-sectional schematic view of a capacitor structure according to the conventional technology.

Referring to FIG. 1, a single film capacitor in the conventional technology includes a housing 11, a core 12 provided inside the housing 11, a top electrode 13, a bottom electrode 14, a pole piece 15 connected to the bottom electrode 14, and terminals 16. In order to meet a requirement that the terminals 16 are located at a same end of the housing 11, the bottom electrode 14 of the single film capacitor needs to be led to a top through the pole piece 15, and then the top electrode 13 of the single film capacitor is led out from the same end of the housing 11, which leads to an increase in material cost.

SUMMARY

In view of the above, a capacitor structure and a power converter are provided in the present disclosure to reduce material cost.

In order to achieve the above objectives, technical solutions provided in the present disclosure are as follows.

In a first aspect of the present disclosure, a capacitor structure is provided, and the capacitor structure includes:
a housing; and
at least one core arranged inside the housing;
where two electrodes of the capacitor structure are led out from two ends of the housing, respectively.

In an embodiment, in a case that the number of the at least one core is one, the at least one core includes the two electrodes; and
in a case that the number of the at least one core is greater than one, the at least one core is connected in series and parallel to form the two electrodes and at least one intermediate electrode, the two electrodes being arranged in head and end of the at least one core, respectively, and the at least one intermediate electrode being arranged between the two electrodes.

In an embodiment, the at least one intermediate electrode is led out from either end of the housing through a corresponding pole piece, respectively.

In an embodiment, the housing is a first hollow structure, and each of the at least one core is a second hollow structure.

In an embodiment, a hollow part of the second hollow structure wraps a hollow part of the first hollow structure.

In an embodiment, the hollow part of the first hollow structure is located at an axial center of the housing, and the hollow part of the second hollow structure is located at an axial center of the at least one core.

In an embodiment, a fin heat dissipation tooth is further provided on an outer surface of the housing.

In an embodiment, the fin heat dissipation tooth is provided on an overall outer surface of the housing and on a hollow outer surface of the housing.

In an embodiment, the housing and each of the at least one core are cylindrical.

In an embodiment, each of the at least one core is a thin film capacitor core.

In a second aspect of the present disclosure, a power converter is provided, the power converter includes at least one capacitor, and the at least one capacitor is the capacitor structure according to any one of the embodiments of the first aspect of the present disclosure.

In an embodiment, a main circuit of the power converter is any one of the following:
a DC-DC conversion circuit, a DC-AC conversion circuit, and an AC-AC conversion circuit.

The capacitor structure provided in the present disclosure includes a housing and at least one core arranged inside the housing, and two electrodes of the capacitor structure are led out from two ends of the housing, respectively. Thus, the pole piece required in a case that electrodes are led from the same end of the housing is omitted, thereby saving material cost. Besides, the housing and the core are respectively hollow structures, and the internal heat of the capacitor structure can be ventilated and dissipated through the corresponding hollow part, thereby improving the heat dissipation performance of the capacitor structure. In addition, by arranging fin heat dissipation teeth on the housing, the heat dissipation area can be increased to further improve the heat dissipation efficiency.

BRIEF DESCRIPTION OF THE DRAWINGS

In order to more clearly explain the embodiments of the present disclosure or the technical solutions in conventional technology, the drawings used in the description of the embodiments or the conventional technology will be briefly introduced below. Obviously, the drawings in the following description are merely some embodiments of the present disclosure. For those of ordinary skill in the art, other drawings can be obtained according to the provided drawings without paying creative labor.

DETAILED DESCRIPTION

The technical solution according to the embodiments of the present disclosure will be described clearly and completely as follows in conjunction with the accompany drawings in the embodiments of the present disclosure. It is obvious that the described embodiments are only a part of the embodiments according to the present disclosure, rather than all of the embodiments. All the other embodiments obtained by those skilled in the art based on the embodiments in the present disclosure without any creative work belong to the scope of protection of the present disclosure.

In the present application, terms "include", "comprise" or any other variations are intended to cover non-exclusive "include", thus a process, a method, an object or a device including a series of factors not only include the listed factors, but also include other factors not explicitly listed, or also include inherent factors of the process, the method, the object or the device. Without more limitations, a factor defined by a sentence "include one . . . " does not exclude a case that there is another same factor in the process, the method, the object or the device including the described factor.

FIG. 1 is a longitudinal cross-sectional schematic view of a single film capacitor according to the conventional technology. Referring to FIG. 1, a bottom electrode of the single film capacitor needs to be led to a top through a pole piece, and then a top electrode of the single film capacitor is led out from the same end of the housing, which leads to an increase in material cost.

In the present disclosure, a capacitor structure is provided to reduce the material cost.

Figure 2:
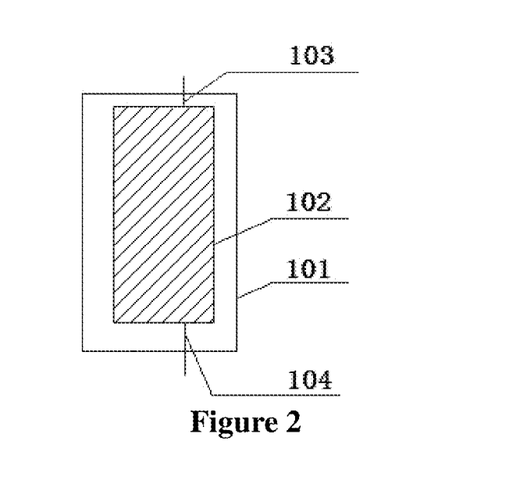
FIG. 2 is a longitudinal cross-sectional schematic view of a capacitor structure according to an embodiment of the present disclosure.

Referring to FIG. 2, the capacitor structure includes a housing 101 and at least one core 102 arranged inside the housing 101.

Two electrodes of the capacitor structure are respectively led out from two ends of the housing 101 nearby.

Specifically, when the number of the core 102 is one, the two electrodes of the core 102 in the capacitor structure are respectively led out from two ends of the housing 101 nearby. Thus, the pole piece required in a case that the electrodes are led from the same end of the housing is omitted, thereby saving material cost.

Referring to FIG. 2, the two electrodes includes a top electrode 103 and a bottom electrode 104. The top electrode 103 is led out from a top of the housing 101, and the bottom electrode 104 is led out from a bottom of the housing 101, eliminating the need for the pole piece when the bottom electrode is led to the top. In addition, the bottom electrode 104 is led out directly at the bottom, which can meet a requirement of two-end wiring with electrodes on the top and bottom, and can be applied to an application of two-end wiring.

Figure 3:
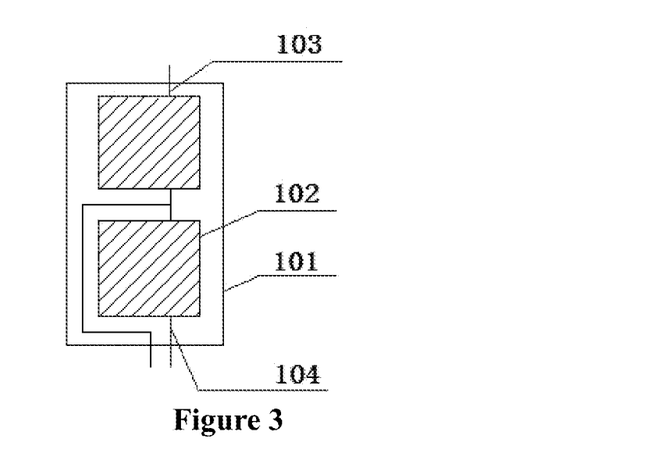
FIG. 3 is a longitudinal cross-sectional schematic view of the capacitor structure according to another embodiment of the present disclosure.

It should be noted that, only one core 102 is provided in the housing 101 is taken as an example in FIG. 2. In an actual application, multiple cores 102 may be provided in the housing 101. That is, multiple cores 102 share the same housing 101, and multiple cores 102 may be connected in any series or parallel connection. For example, the housing 101 may be provided with two cores 102, and the two cores 102 are connected in series, as shown in FIG. 3. A practical application is not limited to this, and it depends on specific application environments, and all are within a protection scope of the present disclosure.

When the number of the core 102 inside the housing 101 is greater than 1, the cores 102 may be connected in series and parallel to form only two electrodes or multiple electrodes. For example, when two cores 102 are connected in series, except for the two electrodes at head and end, a connection point of the two cores 102 is used as an intermediate electrode, which can further be led out from any end of the housing 101 through a corresponding pole piece. Thus, in a case of multiple electrodes, all the electrodes can also be led out from both ends of the housing 101. That is, the electrodes at both ends are led out directly from the two ends of the housing 101 nearby, and remaining intermediate electrode is led out at either end of the housing through a corresponding pole piece.

In the capacitor structure provided by this embodiment, regardless of whether the intermediate electrode is provided, the electrodes are led out through the two ends of the housing 101 respectively. Thus, the pole piece required in a case that electrodes are led from the same end of the housing is omitted, thereby saving material cost.

It is worth noting that in an inverter system, due to increase of an inverter power level and a harsh environment temperature, an internal environment temperature of the inverter where the capacitor is located is relatively high. The core of the film capacitor in FIG. 1 is relatively dense, and internal heat of the core cannot be released in time, which affects life of the capacitor, heat dissipation and normal operation of the entire inverter system.

In view of this situation, another capacitor structure on a basis of the previous embodiment is provided in an embodiment, so as to save material cost while also improving its own heat dissipation performance and improving heat dissipation performance of the entire inverter system.

Figure 4:
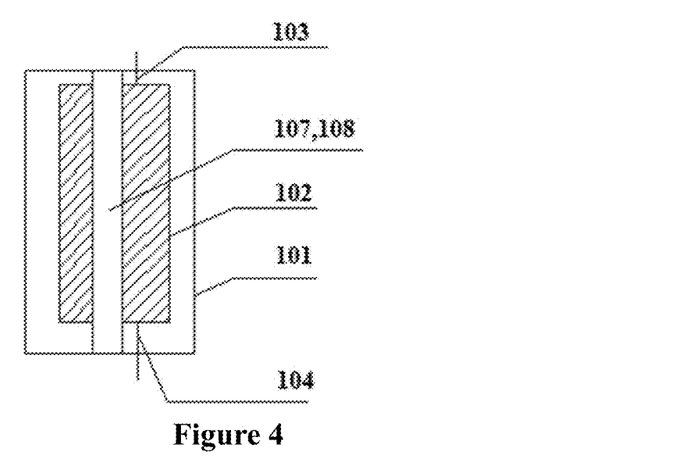
FIG. 4 is a longitudinal cross-sectional schematic view of the capacitor structure according to another embodiment of the present disclosure.
Figure 5:
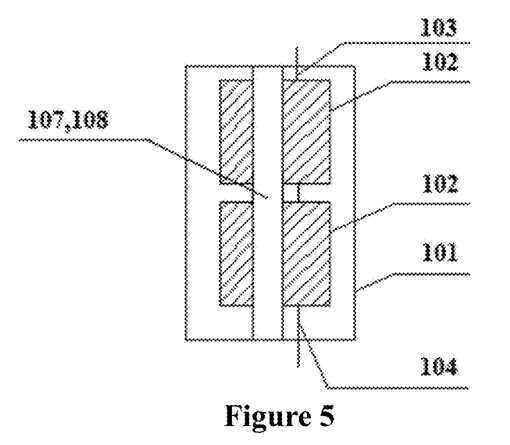
FIG. 5 is a longitudinal cross-sectional schematic view of the capacitor structure according to another embodiment of the present disclosure.

Referring to FIG. 4 (illustrated on a basis of FIG. 2) and FIG. 5 (illustrated on a basis of FIG. 3), the housing 101 and the core 102 are respectively hollow structures. For example, the housing 101 is a first hollow structure, and the core 102 is a second hollow structure.

The hollow structure means that there is a hollow part inside an object, which not only increases a surface area of the object, but also allows the hollow part to ventilate.

Therefore, when the housing 101 and the core 102 of the capacitor structure are hollow structures, hollow parts of the hollow structures increase a heat dissipation area and can pass wind, so that the heat of the core 102 can be transferred to wall surfaces of the hollow parts for heat dissipation, which facilitates release of heat inside the core 102, so that the capacitor structure can not only dissipate heat through the overall outer surface of the housing 101, but also dissipate the internal heat that is most likely to accumulate in the core 102 through the hollow parts.

Compared with the conventional technology as shown in FIG. 1, the capacitor structure provided in this embodiment has a structural difference of the housing 101 and the core 102. Because the housing 101 and the core 102 are hollow structures, the internal heat of the capacitor structure can be ventilated and dissipated through the corresponding hollow parts, thereby improving the heat dissipation performance of the capacitor structure and at the same time improving the overall heat dissipation performance of the inverter system.

On a basis of the previous embodiment, in an actual application, in order to meet a requirement of the core 102 into the housing, a size of a hollow part 108 of the core 102 needs to be larger than a size of a hollow part 107 of the housing 101, so that a volume of the hollow part 108 of the entire core 102 is relatively large and capable of wrapping the hollow part 107 of the housing 101. That is, in the capacitor structure, an inner size of the hollow part 108 of the core 102 needs to be larger than an outer size of the hollow part 107 of the housing 101.

It should be noted that, the size settings of the core and the housing can be set as long as they can meet the requirement of the core body 102 into the housing, and specific sizes of the core and the housing in various directions and a difference between the core and the housing are not limited. They depend on application environments, and are all within the scope of protection of this application.

In addition, in an embodiment of the present disclosure, the housing 101 and the core 102 are respectively cylindrical, especially when the core 102 is a core of the thin film capacitor, which can facilitate realization of the winding process.

In practice, the structures of the housing 101 and the core 102 are not limited to long longitudinal cylindrical shapes, that is, an outer shape of the capacitor structure can be any shape, such as flat torus. As long as there is a hollow part inside, the sharps are all within the scope of protection of the present disclosure.

Moreover, the core 102 is not limited to the core of the film capacitor, and other types of cores are not excluded in practical applications, which are all within the protection scope of the present disclosure.

On a basis of the foregoing embodiments, in the capacitor structure, the hollow parts of the housing 101 and the core 102 are respectively located at their respective axial centers.

A center of the core 102 is often a position where the heat is concentrated and not easily released. Therefore, the hollow part provided in the axial center of the core 102 can better dissipate the accumulated heat.

Of course, in practice, depending on the type of core 102 and the shapes of the housing 101 and the core 102, the corresponding hollow parts can be arranged in other positions, as long as the heat dissipation inside the core 102 can be achieved, which are all within the protection scope of the present disclosure.

Figure 6:
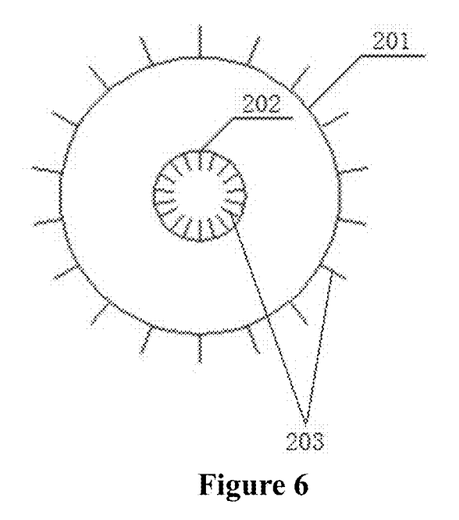
FIG. 6 is a cross-sectional schematic view of the capacitor structure according to an embodiment of the present disclosure.
Figure 7:
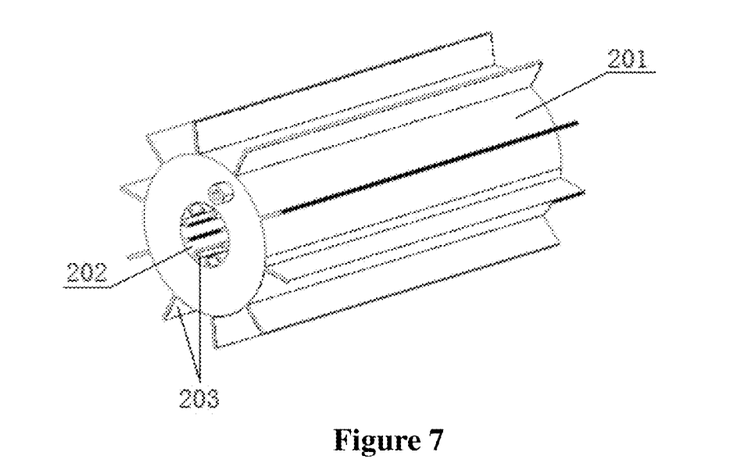
FIG. 7 is a three-dimensional schematic view of the capacitor structure according to an embodiment of the present disclosure.

On a basis of the above-mentioned embodiments, and referring to FIGS. 6 and 7, in the capacitor structure, a fin heat dissipation tooth 203 is further provided on an outer surface of the housing 101 to increase the heat dissipation area.

By arranging the fin heat dissipation tooth 203 on the housing 101, the heat dissipation area can be increased to further improve the heat dissipation efficiency.

It should be noted that, taking the cylindrical shape as an example, FIG. 6 illustrates a cross-sectional shape of the capacitor structure in an axial direction. Referring to FIGS. 6 and 7, the housing 101 has two outer surfaces in the axial direction. One is an overall outer surface with a larger area on the outermost side of the whole. For a distinguishing purpose, it can be called the overall outer surface 201. The other is an outer surface facing the axial center of the whole and enveloping the hollow part, which can be called the hollow outer surface 202.

In practice, in order to further improve efficiency of the capacitor, as illustrated in FIGS. 6 and 7, fin heat dissipation teeth 203 may be provided on the overall outer surface 201 and the hollow outer surface 202 of the housing 101 to increase a heat dissipation contact area of the housing 101 and an external space.

Other structures and principles are the same as those in the above-mentioned embodiments, and will not be repeated here.

A power converter is further provided by another embodiment of the present disclosure. The power converter includes at least one capacitor, and the capacitor is the capacitor structure according to any one of the foregoing embodiments.

Composition and a principle of the capacitor structure are the same as those in the above-mentioned embodiments, and will not be repeated here.

A main circuit of the power converter includes any one of a direct current to direct current (DC-DC) conversion circuit, a direct current to alternating current (DC-AC) conversion circuit, and an alternating current to alternating current (AC-AC) conversion circuit.

Figure 8:
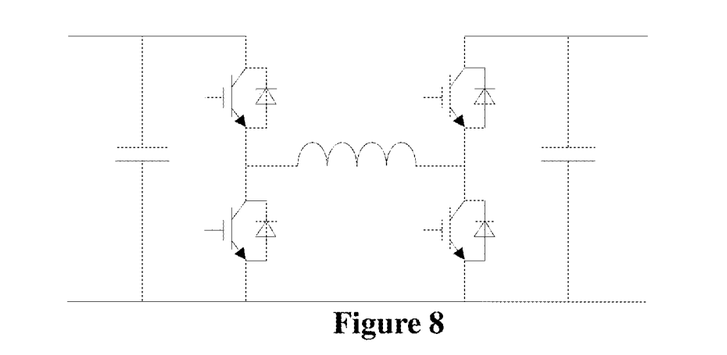
FIG. 8 is a circuit diagram of a DC-DC converter according to an embodiment of the present disclosure.
Figure 9:
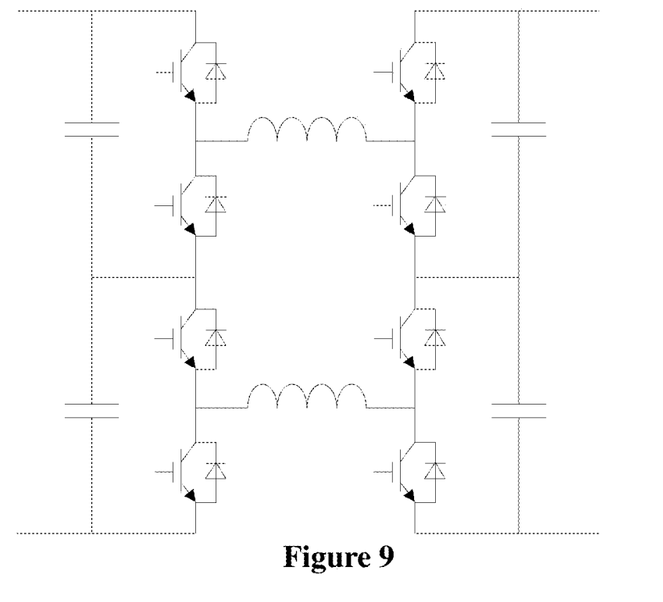
FIG. 9 is a circuit diagram of a DC-DC converter according to another embodiment of the present disclosure.

For example, for a bidirectional DC-DC converter used for charging and discharging a battery system, supporting capacitors on both sides of the DC-DC conversion circuit can be implemented by using this capacitor structure. Moreover, if the supporting capacitor has only positive and negative electrodes, as illustrated in FIG. 8, it can be implemented by one capacitor structure. The number of core 102 in the capacitor structure is not limited. The supporting capacitor can also be implemented by multiple capacitor structures connected in series and parallel. If the supporting capacitor has a midpoint, as illustrated in FIG. 9, it needs to be composed of at least two cores 102 to form the supporting capacitor. Specifically, when there is only one core 102 in the capacitor structure, the supporting capacitor can be formed by connecting two capacitor structures in series, with a connection point of the two capacitor structures as the midpoint. When the capacitor structure includes at least two cores 102, the supporting capacitor may use only one capacitor structure, as long as it can simultaneously has three terminals of positive, negative and midpoint. Of course, an application of using of multiple such capacitor structures in series and parallel is not excluded, and there is no specific limitation here. For other components and working principles inside the DC-DC converter, please refer to the conventional technology, which will not be repeated here.

Figure 10:
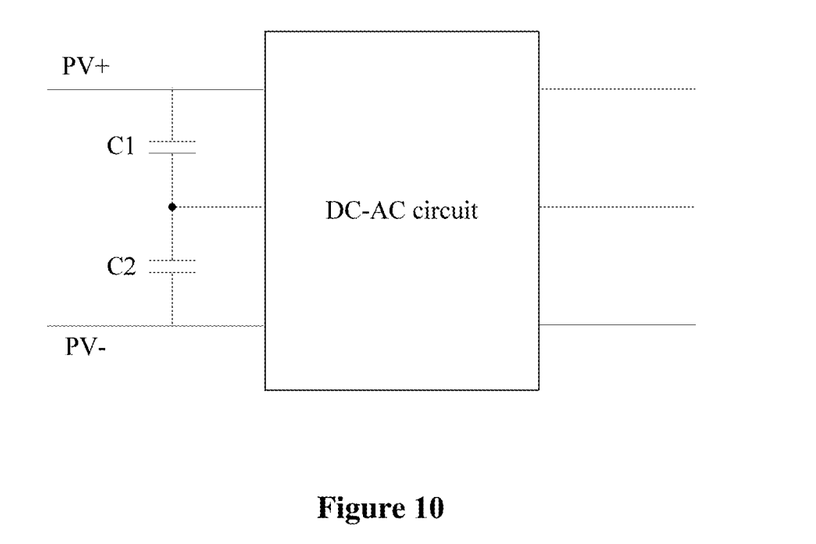
FIG. 10 is a connection schematic view of a DC bus capacitor of an inverter according to an embodiment of the present disclosure.

For another example, for an inverter illustrated in FIG. 10, a DC side of an internal DC-AC conversion circuit of the inverter is provided with DC bus capacitors (including C1 and C2 illustrated in the figure), and an AC side is provided with a filter capacitor (not shown). In practice, left sides of the DC bus capacitors can be directly connected to corresponding photovoltaic strings (PV+ and PV− as illustrated in the figure), or at least one DC-DC conversion circuit can be used to connect to the corresponding photovoltaic strings, which is not specifically limited.

Different from an inverter in the conventional technology, in the inverter in this embodiment, at least one capacitor on the DC side is the capacitor structure described in any paragraph of the above embodiments, or at least one capacitor on the AC side is the capacitor structure described in any paragraph of the foregoing embodiments, or, both at least one capacitor on the DC side and at least one capacitor on the AC side are the capacitor structures described in any paragraph of the foregoing embodiments; there is no specific limitation here, as long as there is at least one capacitor inside is the capacitor structure described in any paragraph of the above-mentioned embodiments, which are all within the protection scope of the present disclosure.

Specifically, when there is only one core 102 in the capacitor structure, for the DC side of the inverter, multiple capacitor structures can be connected in series and parallel to form the DC bus capacitor of the inverter. For example, two capacitor structures are respectively used as a positive half-bus capacitor C1 and a negative half-bus capacitor C2 illustrated in FIG. 10, and are connected in series and parallel to form the DC bus capacitor. A midpoint of the two capacitor structures is taken as a midpoint of the DC bus.

When the capacitor structure includes at least two cores 102, for the DC side of the inverter, only one capacitor structure can be used, and at least one core 102 in an upper part of an inner part of the capacitor structure serves as the positive half-bus capacitor C1, each core 102 in a lower half of the inner part of the capacitor structure serves as the negative half-bus capacitor C2, as long as the capacitor structure can have three terminals of positive, negative and midpoint at the same time. Of course, an application of multiple capacitor structures connected in series and parallel can be used. There is no specific limitation here.

For the AC side of the inverter, such as a three-phase AC side, when there is only one core 102 in the capacitor structure, three such capacitor structures can be used to form an AC side filter capacitor. In practice, a capacitor structure with three cores 102 can also be directly adopted, as long as each core 102 has implemented a connection relationship of the AC side filter capacitor inside the capacitor structure, all of which are within the protection scope of the present disclosure.

For other internal components and working principles of the inverter, please refer to the conventional technology, which will not be repeated here. In addition, the inverter may also be a bidirectional conversion device, which is not limited here, and depends on its specific application environment, and all are within the protection scope of the present disclosure.

In addition, for another example of the AC-AC conversion circuit commonly used in a wind power generation system, capacitors at a grid side, generator side, and DC bus can also be the capacitor structures described in the above embodiments, and a setting method of the capacitors is similar to the above content, which is not repeated one by one.

The above embodiments in this specification are described in a progressive manner. References may be made among these embodiments with respect to the same or similar portions among these embodiments, each of the embodiments is mainly focused on describing its differences from other embodiments. Especially, for the system or system embodiments, since they are similar to method embodiments, the description thereof is relatively simple, and reference may be made to the description of the method embodiments for relevant parts. The embodiments of the system and the system described above are only schematic. The above unit described as a separate component may be or may be not separate physically. The component displayed as a unit may be or may be not a physical unit, that is, may be located at one place or may be distributed on multiple network units. The object of the solution of each of the embodiments may be achieved by selecting a part or all of the modules according to the practical needs. The present application can be understood and implemented by those skilled in the art without any creative efforts.

Persons skilled in the art may further realize that, in combination with the embodiments herein, units and algorithm, steps of each example described can be implemented with electronic hardware, computer software, or the combination thereof. In order to clearly describe the interchangeability between the hardware and the software, compositions and steps of each example have been generally described according to functions in the foregoing descriptions. Whether the functions are executed in a mode of hardware or software depends on particular applications and design constraint conditions of the technical solutions. Persons skilled in the art can use different methods to implement the described functions for each particular application, but it should not be considered that the implementation goes beyond the scope of the embodiments of the present disclosure.

Based on the above description of the disclosed embodiments, those skilled in the art are capable of carrying out or using the present application. It is obvious for those skilled in the art to make many modifications to these embodiments. The general principle defined herein may be applied to other embodiments without departing from the spirit or scope of the present application. Therefore, the present application is not limited to the embodiments illustrated herein, but should be defined by the broadest scope consistent with the principle and novel features disclosed herein.

The invention claimed is:

1. A capacitor structure, comprising:
a housing; and
at least two cores provided inside the housing;
wherein the at least two cores are connected in series and parallel to form two electrodes of the capacitor structure and at least one intermediate electrode, the two electrodes are arranged in head and end of the at least two cores, respectively, and the at least one intermediate electrode is arranged between the two electrodes of the capacitor structure;
wherein the two electrodes of the capacitor structure are led out from two ends of the housing, respectively, and the at least one intermediate electrode is led out from either end of the housing through a corresponding pole piece, respectively;
wherein the housing is a first hollow structure, and each of the at least two cores is a second hollow structure;
wherein an outer surface of the housing comprises an overall outer surface of the housing and on a hollow outer surface of the housing, at least one fin heat dissipation tooth is directly provided on an overall outer surface of the housing, and at least one fin heat dissipation tooth is directly provided on a hollow outer surface of the housing.

2. The capacitor structure according to claim 1, wherein a hollow part of the second hollow structure wraps a hollow part of the first hollow structure.

3. The capacitor structure according to claim 1, wherein the hollow part of the first hollow structure is located at an axial center of the housing, and the hollow part of the second hollow structure is located at an axial center of the at least two cores.

4. The capacitor structure according to claim 1, wherein the housing and each of the at least two cores are cylindrical.

5. The capacitor structure according to claim 1, wherein each of the at least two cores is a thin film capacitor core.

6. A power converter, comprising a main circuit and at least one capacitor, wherein the at least one capacitor comprises:

a housing; and at least two cores provided inside the housing;

wherein the at least two cores are connected in series and parallel to form two electrodes of the capacitor structure and at least one intermediate electrode, the two electrodes are arranged in head and end of the at least two cores, respectively, and the at least one intermediate electrode is arranged between the two electrodes of the capacitor structure;

wherein the two electrodes of the capacitor structure are led out from two ends of the housing, respectively, and the at least one intermediate electrode is led out from either end of the housing through a corresponding pole piece, respectively;

wherein the housing is a first hollow structure, and each of the at least two cores is a second hollow structure;

wherein an outer surface of the housing comprises an overall outer surface of the housing and on a hollow outer surface of the housing, at least one fin heat dissipation tooth is directly provided on an overall outer surface of the housing, and at least one fin heat dissipation tooth is directly provided on a hollow outer surface of the housing.

7. The power converter according to claim 6, wherein the main circuit of the power converter is any one of the following:

a DC-DC conversion circuit, a DC-AC conversion circuit, and an AC-AC conversion circuit.

* * * * *